United States Patent
Bandara et al.

[11] Patent Number: 5,899,973
[45] Date of Patent: May 4, 1999

[54] METHOD AND APPARATUS FOR ADAPTING THE LANGUAGE MODEL'S SIZE IN A SPEECH RECOGNITION SYSTEM

[75] Inventors: Upali Bandara, Leimen; Siegfried Kunzmann, Heidelberg; Karlheinz Mohr, Sinsheim, all of Germany; Burn L. Lewis, Ossining, N.Y.

[73] Assignee: International Business Machines Corporation, Armonk, N.Y.

[21] Appl. No.: 08/860,192
[22] PCT Filed: Nov. 4, 1995
[86] PCT No.: PCT/EP95/04337
  § 371 Date: Sep. 25, 1997
  § 102(e) Date: Sep. 25, 1997
[87] PCT Pub. No.: WO97/17694
  PCT Pub. Date: May 15, 1997
[51] Int. Cl.$^6$ ............................................. G10L 9/00
[52] U.S. Cl. .................. 704/256; 704/257; 704/248; 704/238
[58] Field of Search ................................ 704/256, 257, 704/246, 238

[56] References Cited

U.S. PATENT DOCUMENTS

| | | | |
|---|---|---|---|
| 5,072,452 | 12/1991 | Brown et al. | 704/256 |
| 5,127,043 | 6/1992 | Hunt et al. | 379/88 |
| 5,444,617 | 8/1995 | Merialdo | 364/419.1 |
| 5,680,511 | 10/1997 | Baker et al. | 704/257 |
| 5,710,866 | 1/1998 | Alleva et al. | 704/256 |

*Primary Examiner*—David R. Hudspeth
*Assistant Examiner*—Susan Wieland
*Attorney, Agent, or Firm*—Robert P. Tassinari, Jr.

[57] ABSTRACT

In this speech recognition system, the size of the language model is reduced by discarding those n-grams that the acoustic part of the system can recognize most accurately without support from a language model. The n-grams can be discarded dynamically during the running of the system or during the build or setup-time of the system. Trigrams occurring infrequently in the text corpora are substituted for the discarded n-grams to increase the accuracy of the word recognitions.

18 Claims, 4 Drawing Sheets

METHOD AND APPARATUS FOR ADAPTING THE LANGUAGE MODEL'S SIZE IN A SPEECH RECOGNITION SYSTEM

TECHNICAL FIELD

The present invention concerns speech recognition systems being implemented in a digital computer, or speech recognition devices like dictaphones or translation devices for telephone installations. In particular, the invention is directed to a mechanism for decreasing the size of the statistical language model in such speech recognition systems in order to reduce the needed resources, such as storage requirements, to process such systems. The language model's size can be also adapted to the system environment conditions or user specific speech properties.

BACKGROUND OF THE INVENTION

In speech recognition systems being based on a statistical language model approach instead of being knowledge based, for example the English speech recognition system TANGORA developed by F. Jelinek et al. at IBM Thomas J. Watson Research Center in Yorktown Heights, USA, and published in Proceedings of IEEE 73(1985)11, pp.1616–24), entitled "The development of an experimental discrete dictation recognizer", the recognition process can be subdivided into several steps. The tasks of these steps depicted in FIG. 1 (from article by K. Wothke, U. Bandara, J. Kempf, E. Keppel, K. Mohr, G. Walch (IBM Scientific Center Heidelberg), entitled "The SPRING Speech Recognition System for German", in Proceedings of Eurospeech 89, Paris 26.-28.IX.1989), are

- extraction of a sequence of so-called acoustic labels from the speech signal by a signal processor;
- fast and detailed acoustic match to find those words which are most likely to produce the observed label sequence;
- computation for a sequence of words the probability of their occurrence in the language by means of a statistical language model.

The whole system can be either implemented on a digital computer, for example a personal computer (PC), or implemented on a portable dictaphone or a telephone device. The speech signal is amplified and digitized, and the digitized data are then read into a buffer memory contained for example in the signal processor. From the resulting frequency spectrum a vector of a number of elements is taken and the spectrum is adjusted to account for an ear model.

Each vector is compared with a number of (say 200) speaker dependent prototype vectors. The identification number which is called an acoustic label, of the most similar prototype vector, is taken and sent to the subsequent processing stages. The speaker dependent prototype vectors are generated from language specific prototype vectors during a training phase for the system with a speech sample.

The fast acoustic match determines for every word of a reference vocabulary the probability with which it would have produced the sequence of acoustic labels observed from the speech signal. The probability of a word is calculated until either the end of the word is reached or the probability drops below a pre-specified level. The fast match uses as reference units for the determination of this probability a so-called phonetic transcription for each word in the reference vocabulary, including relevant pronunciation variants, and a hidden Markov model for each allophone used in the phonetic transcription. The phonetic transcriptions are generated by use of a set of phoneticization rules (l.c.)

The hidden Markov model of an allophone describes the probability with which a substring of the sequence of acoustic labels corresponds to the allophone. The Markov models are language specific and the output and transition probabilities are trained to individual speakers. The Markov model of the phonetic transcription of a word is the chain of the Markov models of its allophones.

The statistical language model is one of the most essential parts of a speech recognizer. It is complementary to the acoustic model in that it supplies additional language-based information to the system in order to resolve the uncertainty associated with the word hypothesis proposed by the acoustic side. In practice, the acoustic side proposes a set of possible word candidates with the probabilities being attached to each candidate. The language model, on the other hand, predicts the possible candidates with corresponding probabilities. The system applies maximum likelihood techniques to find the most probable candidate out of these two sets of candidates.

For the purpose of supplying this language-based information, the language model uses a priori computed relative frequencies for word sequences, for practical reasons usually consisting of three words, i.e. trigrams, that are word triplets '$w_1\ w_2\ w_3$'. It is hereby assumed that the probability for '$w_3$' to occur depends on the relative frequencies for '$w_3$' (unigrams), '$w_2\ w_3$' (bigrams), and '$w_1\ w_2\ w_3$' (trigrams) in a given text corpus. For the computation of those frequencies a very large authentic text corpus from the application domain, e.g. real radiological reports or business correspondences, is needed.

The language model receives from the fast acoustic match a set of word candidates. For each of these candidates it determines the probability with which it follows the words which have already been recognized. For this purpose the language model uses probabilities of single words, word pairs, and word triples. These probabilities are estimated for all words in the vocabulary using large text corpora. The word candidates with the highest combined probabilities supplied by the fast match and the language model are selected and passed to the detailed match.

The detailed acoustic match computes for each word received from the language model the probability with which it would produce the acoustic label sequence observed. In contrast to the fast acoustic match, the detailed match does not perform this process for all words of the reference vocabulary but only for those received from the language model, and that it does not use phonetic transcriptions and hidden Markov models of allophones as reference units. Instead, the detailed match uses hidden Markov models of so-called fenemic phones which are artificial sound units which usually correspond to one acoustic label.

The three probabilities of the fast match, of the language model, and of the detailed match are then combined for the most likely sequences. At the end of each hypothesis the fast match, the language model, and the detailed match are started again.

In the field, the foregoing approaches use about 20.000 words to cover at least 95% of words uttered. A large text corpus from the domain is analyzed to get the relative frequencies for all of the occurring unigrams, bigrams and trigrams. The number of theoretically possible trigrams for a vocabulary of 20.000 words is $20.000^3 = 9 \times 10^{12}$. Only a small fraction of this amount is actually observed. Even then about 170 MB disk capacity is required by the speech recognizer to store a language model file which contains all the trigrams and the corresponding frequencies. This file is used during run time.

There are three adverse effects due to the large size of the language model file:

1. The required disk capacity is large and thus the hardware costs of the recognizer unit is expensive;
2. the speed performance of the recognizer becomes increasingly poor due to the long retrieval delay for searching in a large file;
3. it is difficult to port the speech recognizer software to smaller and cheaper computers with relatively slow processor power, e.g. Laptops.

For the above reasons, the size of the language model used in these prior art speech recognition technology is a trade-off between the retrieval delay and the recognition accuracy. According to this kind of approaches the language model file is compressed by discarding trigrams which have occurred only at a frequency less than a given threshold, e.g. three times less. Thereby the assumption is made that if a certain trigram occurs very seldom in the corpus, then this trigram will most likely not be uttered by the speaker. This approach results in squeezing the size of the language model to achieve high processing speeds, but at a potential loss of recognition accuracy.

During real field applications it is observed that the above assumption is not realistic. In many cases, some trigrams were observed only once not because they are seldom, but the size of the evaluated text corpus was very limited. However, the speakers do utter those socalled singleton trigrams.

There are further prior art techniques, for example a method for compressing a fast match table to save memory space as described in an article by M. Nishimura, in IBM Technical Disclosure Bulletin (TDB), No. 1, June 1991, pp.427–29 and entitled "Method for Compressing a Fast Match Table". A further approach relates to a method for compressing a library containing a large number of model utterances for a speech recognition system, which was published by H. Crepy, in IBM TDB, No. 2, February 1988, pp.388–89. The first article discloses a solution by use of a binary tree coding algorithm, the second article by use of common data compression techniques. Particularly, both approaches concern squeezing of the acoustic part of a speech recognizer, and not of the language model size.

The above approaches for compression of language model files have led to compact models in the past, but the resulting recognition error rate was considerably high, because the users have uttered the discarded trigrams, while they were not being supported by the language model. Those systems had to depend solely on the acoustic side. This immediately led to recognition errors for acoustically identical or similar words, e.g. 'right'-'write' or 'daβ'-'das'.

The problem underlying the present invention, therefore, is to provide a mechanism for speech recognizers of the above characteristics which allows a strong reduction of the size of the language model, but avoids the beforehand discussed disadvantages.

BRIEF DESCRIPTION OF THE INVENTION

The underlying problems and advantages of the invention are accomplished by a mechanism which discards those trigrams for which the acoustic part of the system requires less support from the language model to recognize correctly. The proposed method is suitable for identifying those trigrams in a language model for the purpose of discarding during built-time or run time of the system. Provided is also another automatic classification scheme for words which allows the compression of a language model, but under retention of accuracy.

The purposely defined acoustic distance between the words is used as the criterion to discard inefficient trigrams. The proposed methods allow squeezing of the language model size without a considerable loss of recognition accuracy. Moreover it allows an efficient usage of sparsely available text corpora because even singleton trigrams are used when they are helpful. No additional software tool is needed to be developed because the main tool, the fast match scoring, is a module readily available in the known recognizers themselves.

The effectiveness of the proposed method can be further improved by classification of words according to the common text in which they occur as far as they distinguish from each other acoustically.

Besides a reduction, the size of the language model can be also adapted to the system environment conditions like storage size or processor velocity, or to the user specific pronunciation which has a direct impact on the acoustic distance of uttered words.

For all those reasons, the proposed method opens the possibility to make speech recognition available in low-cost personal computers (PC's), even in portable computers like Laptops.

BRIEF DESCRIPTION OF THE DRAWINGS

These and other objects, features and advantages of the invention will be more fully appreciated with reference to the accompanying figures.

DETAILED DESCRIPTION

Figure 1:
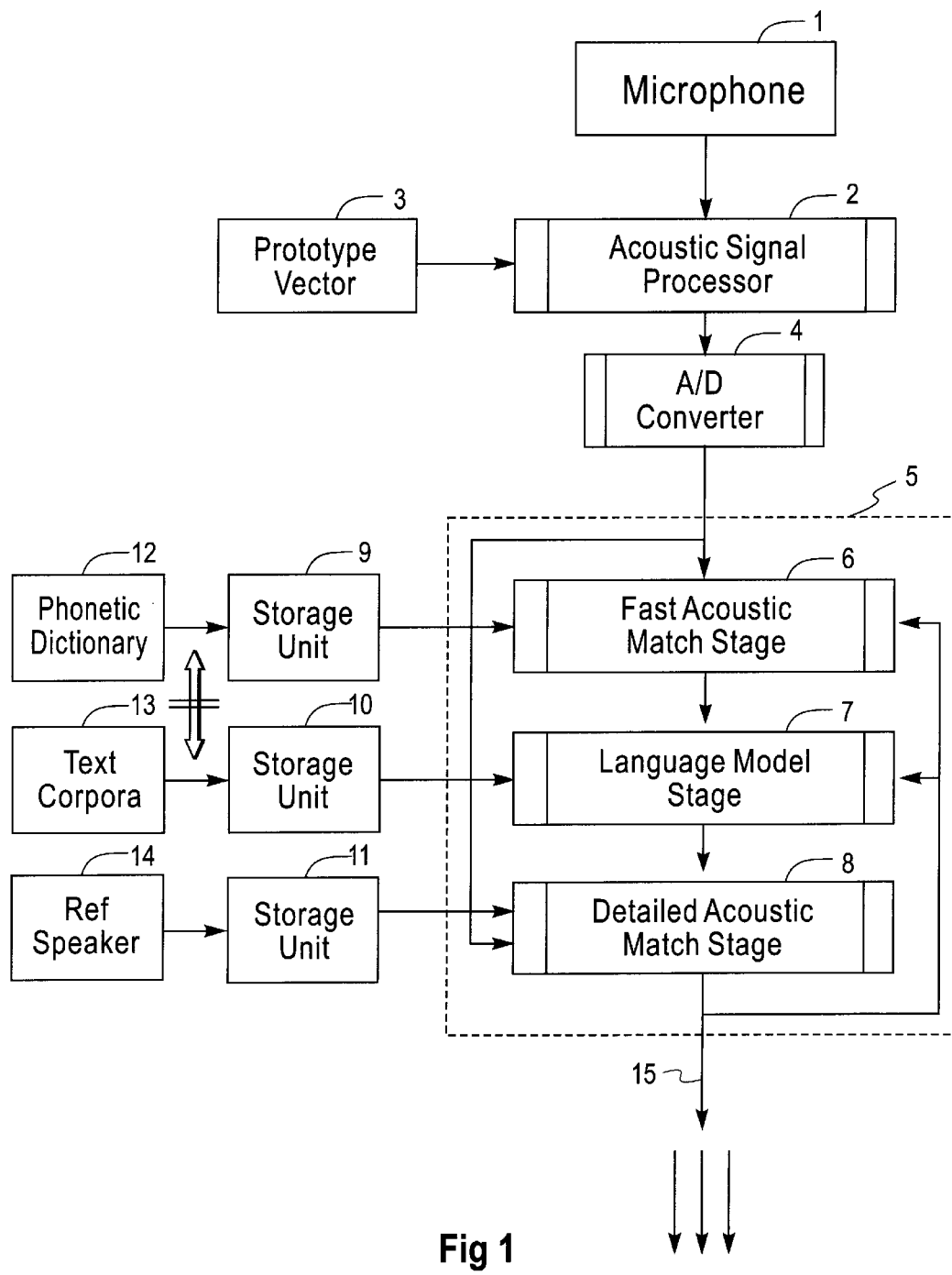
FIG. 1 is a block diagram depicting a state-of-the-art speech recognition system, where the acoustic and the statistic recognition parts are performed independently of each other.

FIG. 1 shows a speech recognition system according to the state-of-the-art. Such a system has been already discussed in the introductory part.

The uttered speech signal is recorded by means of a microphone 1, and the resulting analog signal delivered to an acoustic signal processor 2. Alternately the uttered speech signal can be first recorded by a dictaphone, and then transferred from the dictaphone to a computer off-line.

By use of prototype vector stored in a memory 3, the signal processor 2 generates a sequence of acoustic labels. This sequence being converted from an analog into a digital data format by means of an analog-to-digital converter 4 is the starting point for a a more thorough analysis which is accomplished by a decoder 5. The decoder 5 contains the three stages of recognition, namely a fast acoustic match stage 6, a language model stage 7, and a stage 8 for a detailed acoustic match. The stages 4 and 7 each deliver word candidates.

By the three recognition stages 6, 7 and 8 each get their input from storage units 9, 10 and 11. The fast acoustic match stage 6 is fed from storage unit 9 which contains vocabulary represented as sequences of allophones according to the Markov model as reference units. The source for getting the vocabulary is a phonetic directionary 12.

Instead, the detailed match 8 uses (artificial) subunits of allophones as Markov models of so-called fenemic phones wherein providing a vocabulary represented as sequences of those fenemic phones. The underlying phones are provided by a number of reference speakers 14.

The storage unit 10 contains n-gram statistics of word sequences which are created by use of text corpora 13 according to the prior art recognition systems, broadly described in the above mentioned documents.

It is noted that the stages 6, 7 an 8 co-operate during the recognition phase fulfilled by the decoder 5.

At the output 15 of the decoder 5, a sequence of words in a digital format is delivered, the respective format depending on the type of application. For example the sequence of words can be orthographic text readable by a text processing system, or it can be delivered in a machine readable format.

Figure 2:
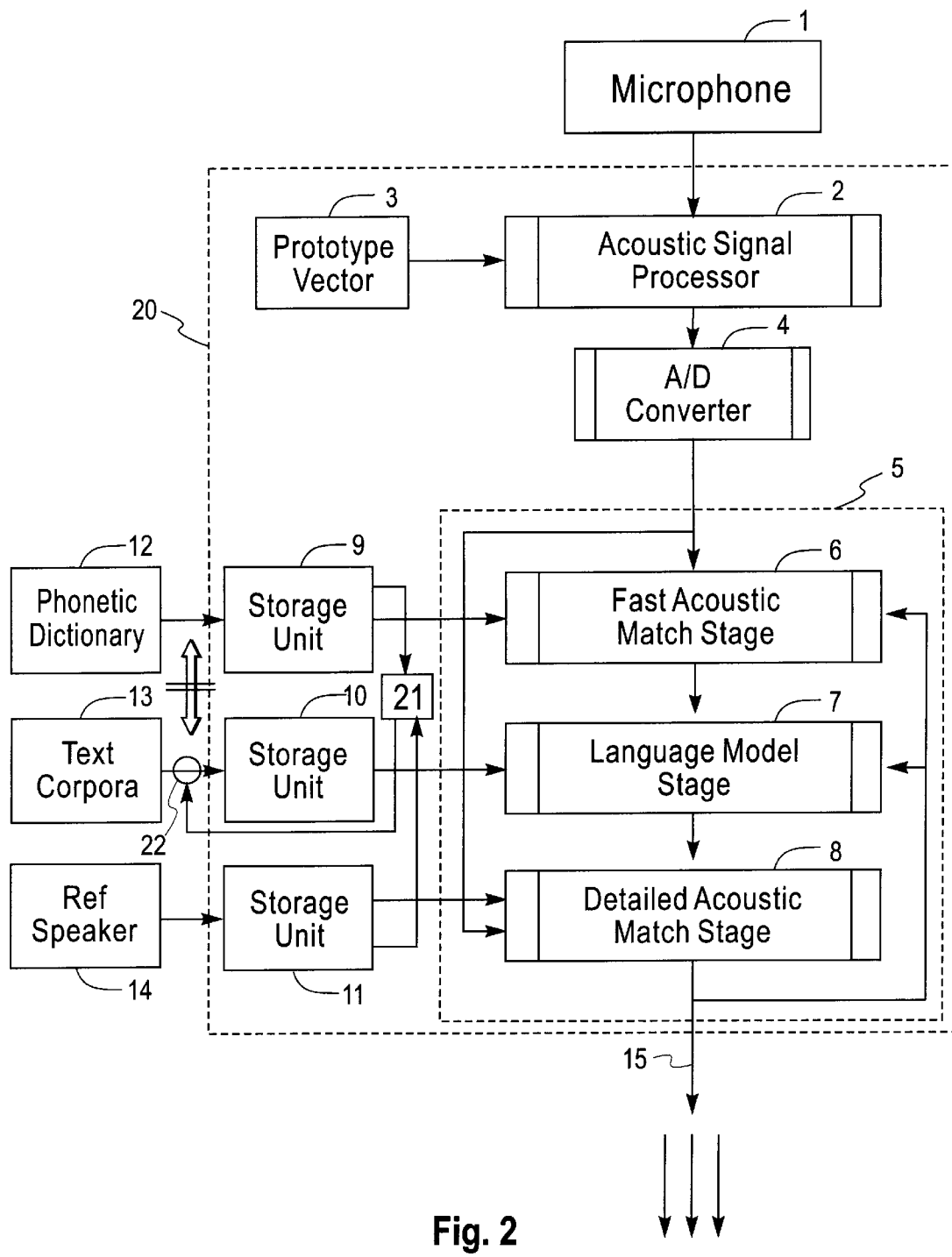
FIG. 2 shows a respective block diagram of a first embodiment of a speech recognition system according to the invention, in which the language model size is adapted during the built-time of the system.

FIG. 2 shows a speech recognition system 20 as in FIG. 1, but which comprises another functional unit 21 according to a first embodiment of the invention. The unit 21 calculates the acoustic distance according to the method herein disclosed, and is fed by the data stored in the memory units 9 and 11. Alternately, the unit 21 can be implemented in decoder 5. For the latter case, the frequencies calculated by stages 6 and 8 are directly taken as a basis.

The results of the method herein disclosed and implemented in functional unit 21 are used to reduce the contents of storage unit 10 which contains the n-gram statistic of word sequences. Hereto the above results are fed into unit 10 via path 22. The language model size is reduced with respect to the acoustic distance, that is for example by constructing new classes of words, that share e.g. their language pattern, but are easy separable by their accoustic distance.

Figure 3:
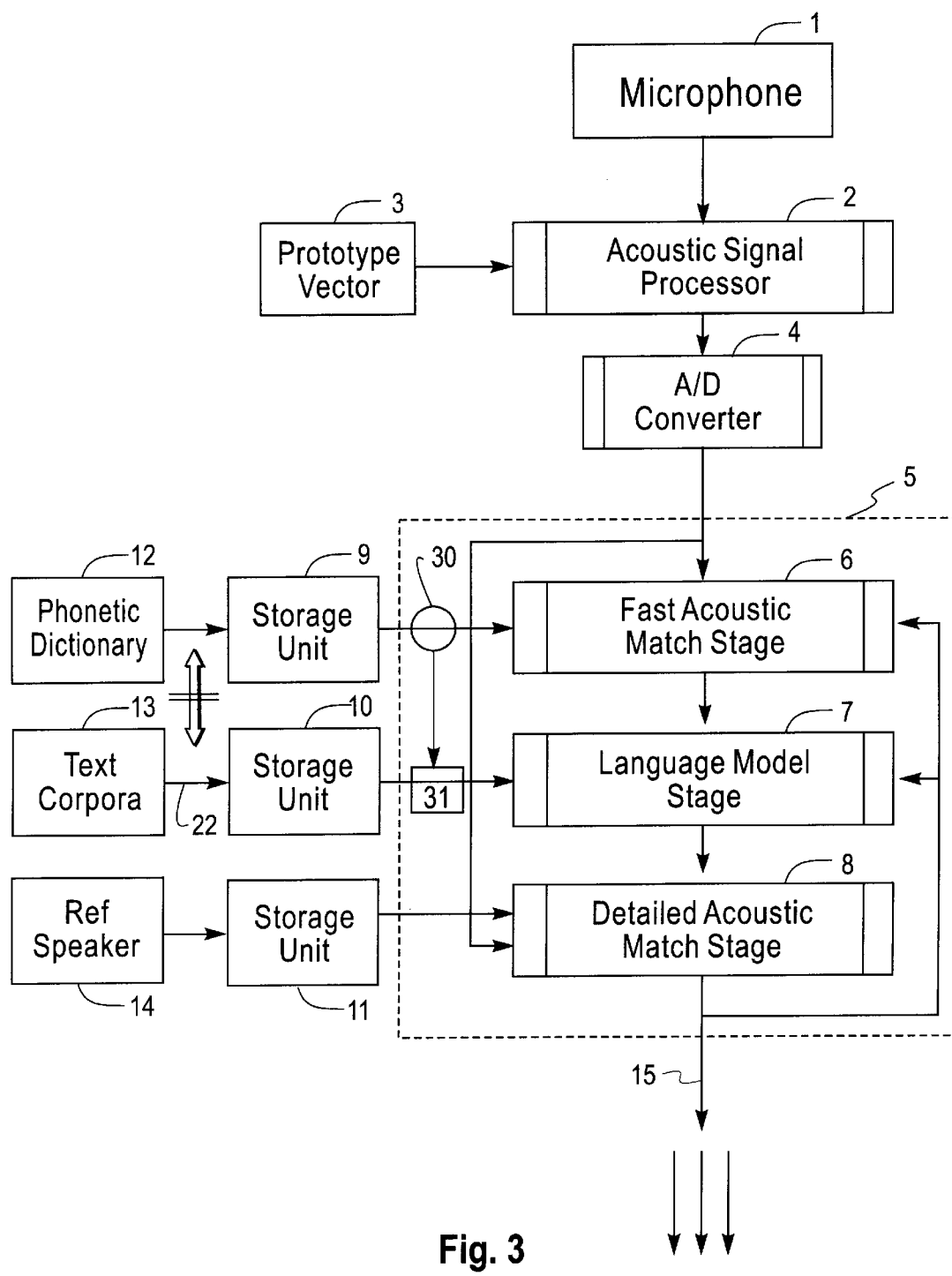
FIG. 3 shows a second embodiment of the invention where adaptation of the language model size is accomplished during run time of the recognition system.

In FIG. 3 another embodiment of the invention is depicted where adaptation of the language model size is accomplished dynamically during run time of the speech recognition system 20. Hereby a functional unit 30 calculates a user-specific acoustic distance, based on the vocabulary stored in unit 9. By use of that information, a user-specific language model stored in unit 31 is created. The size of that language model differs from the size of the model stored in memory 10 in that it is reduced or enlarged depending on the user-characteristic utterance quality, that is the distinctiveness of words of similar timbre.

In the following, the method for changing the size of the language model according to the invention is described in more detail with respect to a preferred implementation.

Let the acoustic distance factor for a trigram be defined as a. Further, we define the predictive power of a trigram f as the relative frequency for that trigram. We define a weighting function g for each trigram in terms of a and f as $$g = ka/f \quad (1)$$

where k is a weighting coefficient, which is determined by trial and error. According to the method, the weighting function g is computed for each trigram. A threshold value for g is determined also by trial and error. If for a given trigram g surpasses the threshold, then the trigram is discarded.

Figure 4:
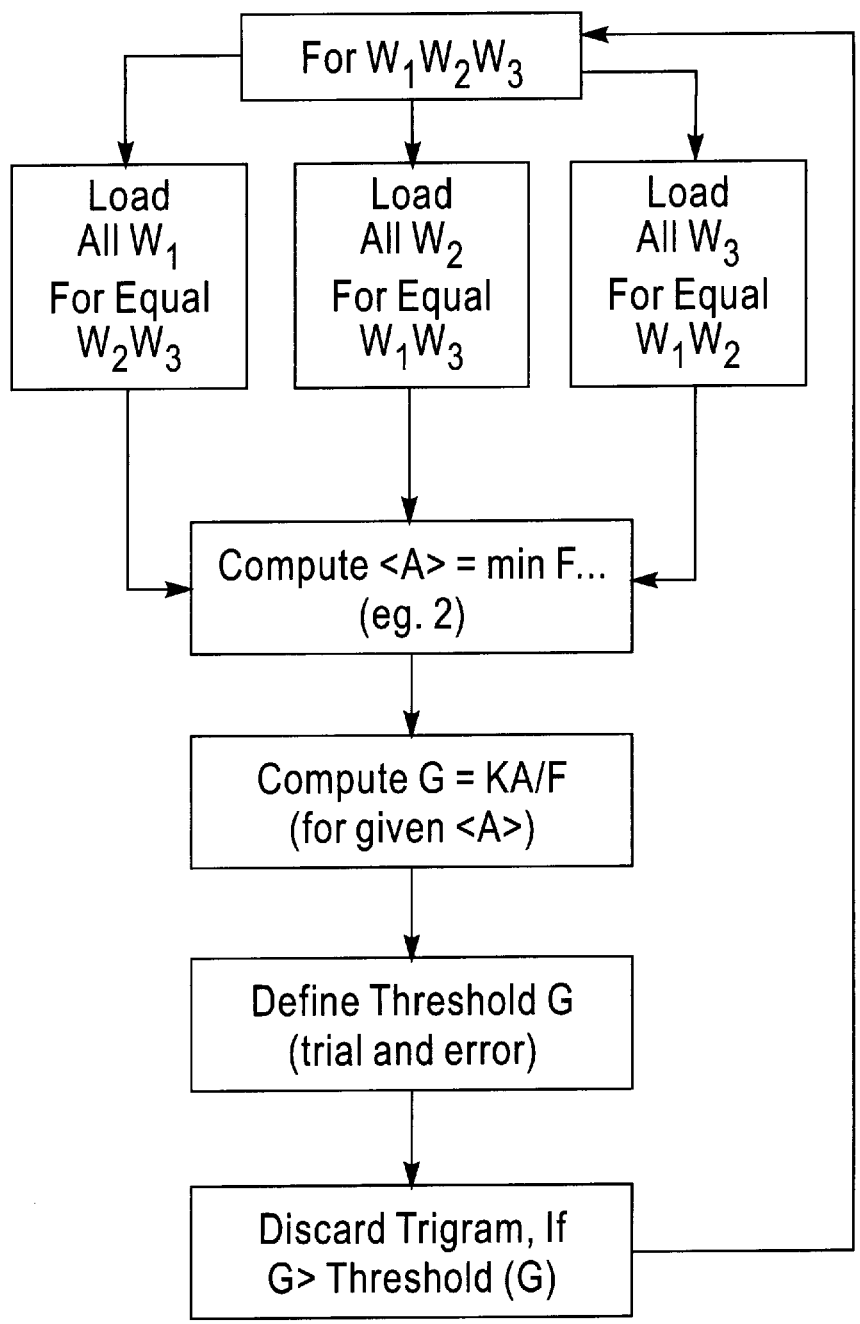
FIG. 4 is a flow-chart illustrating the proposed scheme for adapting the language model size.

This procedure involves the following steps depicted in FIG. 4:

Take a trigram
Take all w3 for equal w1 and w2
Take all w2 for equal w1 and w3
Take all w1 for equal w2 and w3
Compute the normalized value of a, as described in equation 2
Compute g in equation 1 using the normalized frequency for the trigram of step 1
Discard the trigram from the language model if the computed value exceeds the threshold gt
Go to step 1 with the next trigram In a further embodiment, the words in a set of words W defined beforehand, are put into a single class as far as the corresponding word yields a value of g (equation 1) that exceeds a given threshold. In this case, a word is allowed to occur in a context class as well as an individual word depending on the context in which it occurs. Such a classification leads to a further reduction of the storage capacity needed, e.g. for all members of the class, the same storage for context information is used. So the saving would be on average:

k per word, N words in a class, would save (N-1). k storage.

The acoustic distance factor 'a' for a given trigram w1w2w3 can be calculated by means of the following method. Let W be the set of words w1w2w3, where the words w3 are observed for a given context w1 w2. Hereby a word can be a word element like a morpheme or a lexical unit, for example a syllable or a diphone. Then the acoustic distance a is defined for a word wk with respect to the set W as $$a(w_k, W) = \min P(u(w_k)|p(w_i)) w_i W \quad (2)$$

where $P(u(w_k)|p(w_i))$ can be regarded as the score produced by the fast match acoustic model of a word $w_i$ when presented with the acoustic of the word $w_k$. Then $a(w_k, W)$ is the minimum score observed in the fast-match tree which is built up with the set W. This term is evaluated by creating the fast match tree with the set W, taking the acoustic signal of the word $w_k$, and evaluating the acoustic signal against the fast match tree. The minimum score hereby observed is taken as $a(w_k, W)$.

Computation of the value $a(w_k, W)$ can be accomplished by the steps of 1. taking the trigram w1w2w3
2. determining the set of all w3's for a constant w1w2
3. regarding the set of w3 as W and the specific w3 as $w_k$; and evaluating $a(w_k, W)$ as described above.

This value of a is substituted in equation 1 to compute the weighting function g.

In the above procedure only the case where w3 is predicted with a constant w1w2, is considered. One can also consider the analogous cases where w1 is predicted with constant a w2w3, as follows:

The generalized term $a(w_k, W)$ can be written for all specific cases as $a(w3_k, W3w1w2), a(w2_k, W2), a(w1_k W1w2w3)$. The actual distance factor a, is the minimum term of the above three terms, i.e $$a = \min\{a(w3_k, W3w1w2), a(w2_k, W2w1w3), a(w1_k, (W)1w2w3)\} \quad (3)$$

The acoustic distance factor a according to the invention can be used to qualify trigrams w1w2w3 in a language model for the purpose of deleting them, and thus to compress the language model file. By the proposed combination of acoustic distance and relative frequencies of trigrams in the language model, a criterion to decide which trigram is to be discarded can be computed automatically, i.e. without need of any kind of interaction by the user.

We claim:

1. For use in a speech recognition device or system a method comprising the steps of:
   a) using an acoustic match for analyzing acoustic speech signals and delivering respective word candidates;
   b) using a language model match for determining for each of the word candidates a language model based probability that the respective word candidate follows the words which have already been recognized; and
   c) limiting the size of the language model, used in the language model match by:
      i) providing acoustic distance values that measure the accuracy of the acoustic matches for the words contained in the language model;
      ii) defining a threshold value for the acoustic distance values to identify words where the acoustic match exceeds a selected level;
      iii) identifying the words in the language model for which the acoustic distance values surpass the threshold value; and
      iv) providing only words that do not exceed the threshold value in the language model.

2. A method according to claim 1, including the step of taking the acoustic distance values from the acoustic recognition results of the acoustic match.

3. A method according to claim 2, including the step of defining the threshold value by the specific acoustic speech characteristics of the respective user.

4. A method according to claim 3, including the step of discarding the words for which the acoustic distance values surpasses the threshold value during the build or setup-time of the device or system.

5. A method according to claim 3 including dynamically discarding from the language model during the run time of the device or system the words for which the acoustic distance values surpass the threshold value.

6. A method according to claim 1, including the step of using in the language model words that occur two or less times in a text corpora.

7. A method for use in a speech recognition device or system comprising the steps of:
   a) recording an acoustic speech signal;
   b) digitizing the acoustic speech signal;
   c) generating acoustic labels for the digitized speech signal;
   d) performing one acoustic match for determining words of a reference vocabulary the probability with which it would have produced the sequence of acoustic labels, and delivering respective word candidates;
   e) using a language model for determining for each of the word candidates the probability with which it follows the words which have already been recognized based on a n-gram statistic of the words in the vocabulary by use of large text corpora; and
   f) adapting the size of the language model by:
      i) providing acoustic distance that measure the accuracy of the acoustic match for words contained in the language model;
      ii) defining a threshold value for the acoustic distance that identifies words where the acoustic match exceeds a selected level;
      iii) identifying the N-grams for which the acoustic distance surpasses the threshold value; and
      iv) eliminating identified N-grams from the language model.

8. A method according to claim 7, including step of taking the acoustic distances from the acoustic recognition results of the acoustic match.

9. A method according to claim 8, including the step of determining the acoustic distance by specific speech characteristics of a user.

10. A method according to claim 9, including the step of adjusting of N-grams during the installation phase of the device or system.

11. A method according to claim 9, including the step of adjusting of N-grams dynamically during run time of the device or system.

12. A method according to claim 11, including the step of providing context classes for words for which the acoustic distance values surpass the threshold value.

13. A method according to claim 7, including the step of detemining the acoustic distance for a word $w_k$ with respect to a set of words $W_1$ being all words observed for a given context, by the minimum score observed in the fast-match tree of the acoustic model of a word wi when presented with the acoustic of the word $w_k$.

14. A method according to claim 13, including the step of taking a trigram w1w2w3, finding the set of all w3 for a constant w1w2, regarding the set of w3 as W and the specific w3 as wk, and evaluating an acoustic distance factor a for all specific cases as $a(w3_k, W3_{w1w2})$, $a(w2_k, W2_{w1w3})$, $a(w1_k, W1_{w2w3})$.

15. A method according to claim 14, including the step of defining a weighting function for each trigram w1w2w3 as the quotient of an acoustic distance factor for the trigram and a predictive power for the relative frequency for that trigram by use of a weighting coefficient, and determining a threshold value dependent on the device of system environment.

16. A method according to claim 15, including the step of taking the combination of the acoustic distance and relative frequencies for word N-grams as a basis for computing the criterion to decide which N-grams is to be discarded.

17. A method according to claim 7, including the step of replacing the eliminated words with words that occur two or less times in the large text corpora.

18. A speech recognition system comprising:
   a) an acoustic match mechanism for analyzing acoustic speech signals providing acoustic distance values that measure the acoustic matches for words and delivering respective word candidates; and
   b) a language model for determining for each of the word candidates a language model based probability that the respective word candidate follows the words which have already been recognized, wherein words in the language model are limited to those with an acoustic distance value that falls below a threshold value where the acoustic match exceeds a selected level.

* * * * *